(12) United States Patent
Philippin et al.

(10) Patent No.: US 8,769,820 B2
(45) Date of Patent: Jul. 8, 2014

(54) METHOD FOR MACHINING THE TOOTH EDGES OF END-CUT WORK WHEELS

(75) Inventors: Matthias Philippin, Rutesheim (DE); Juergen Pastow, Ingersheim (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 1103 days.

(21) Appl. No.: 12/756,402

(22) Filed: Apr. 8, 2010

(65) Prior Publication Data
US 2010/0278605 A1 Nov. 4, 2010

(30) Foreign Application Priority Data

Apr. 29, 2009 (DE) .................. 10 2009 019 433

(51) Int. Cl.
*B23P 23/00* (2006.01)
*B21K 1/30* (2006.01)
*B23F 19/10* (2006.01)
*B23F 5/00* (2006.01)

(52) U.S. Cl.
USPC ............... 29/893.35; 29/56.5; 29/566; 409/8; 409/12; 409/51; 409/55

(58) Field of Classification Search
USPC .............. 29/893.35, 56.5, 566, 558; 408/8–9, 408/50–51, 11–12, 40, 55; 451/219, 253; 409/8–9, 50–51, 11–12, 40, 55
See application file for complete search history.

(56) References Cited

U.S. PATENT DOCUMENTS

| | | | | |
|---|---|---|---|---|
| 2,451,447 A * | 10/1948 | Ransome | .......................... | 409/8 |
| 4,961,289 A | 10/1990 | Sulzer | | |
| 5,953,947 A * | 9/1999 | Klein | .............................. | 72/213 |
| 6,386,953 B1 * | 5/2002 | Wirz | ............................... | 451/47 |
| 7,103,973 B2 | 9/2006 | Wolff et al. | | |

FOREIGN PATENT DOCUMENTS

| | | |
|---|---|---|
| DE | 4328801 A1 | 3/1995 |
| DE | 10249039 B4 | 9/2005 |
| DE | 102005054237 A1 | 5/2007 |
| DE | 10230148 B4 | 6/2009 |
| EP | 0282046 A2 | 9/1988 |
| EP | 1495824 A2 | 1/2005 |

OTHER PUBLICATIONS

Search Report from German Patent Office for priority application DE 102009019433.9.
Extended European Search Report for EP 10002012.2 (corresponding to U.S. Appl. No. 12/756,402).

\* cited by examiner

*Primary Examiner* — Sarang Afzali
(74) *Attorney, Agent, or Firm* — Robert L. McDowell

(57) ABSTRACT

A method and a device for machining the tooth edges (23, 25) developed between each end face (22, 24) and the tooth flanks (26, 27) of end-cut work wheels (2). The axis of rotation (20) of the spindle that carries the machining tool (21) is displaced around an orthogonal swivel axis (16) relative to the tool axis of rotation so that the cutting directions are opposite to each other with respect to the work wheel (2) in the machining of the lower tooth edges (23) and the upper tooth edges (25).

6 Claims, 1 Drawing Sheet

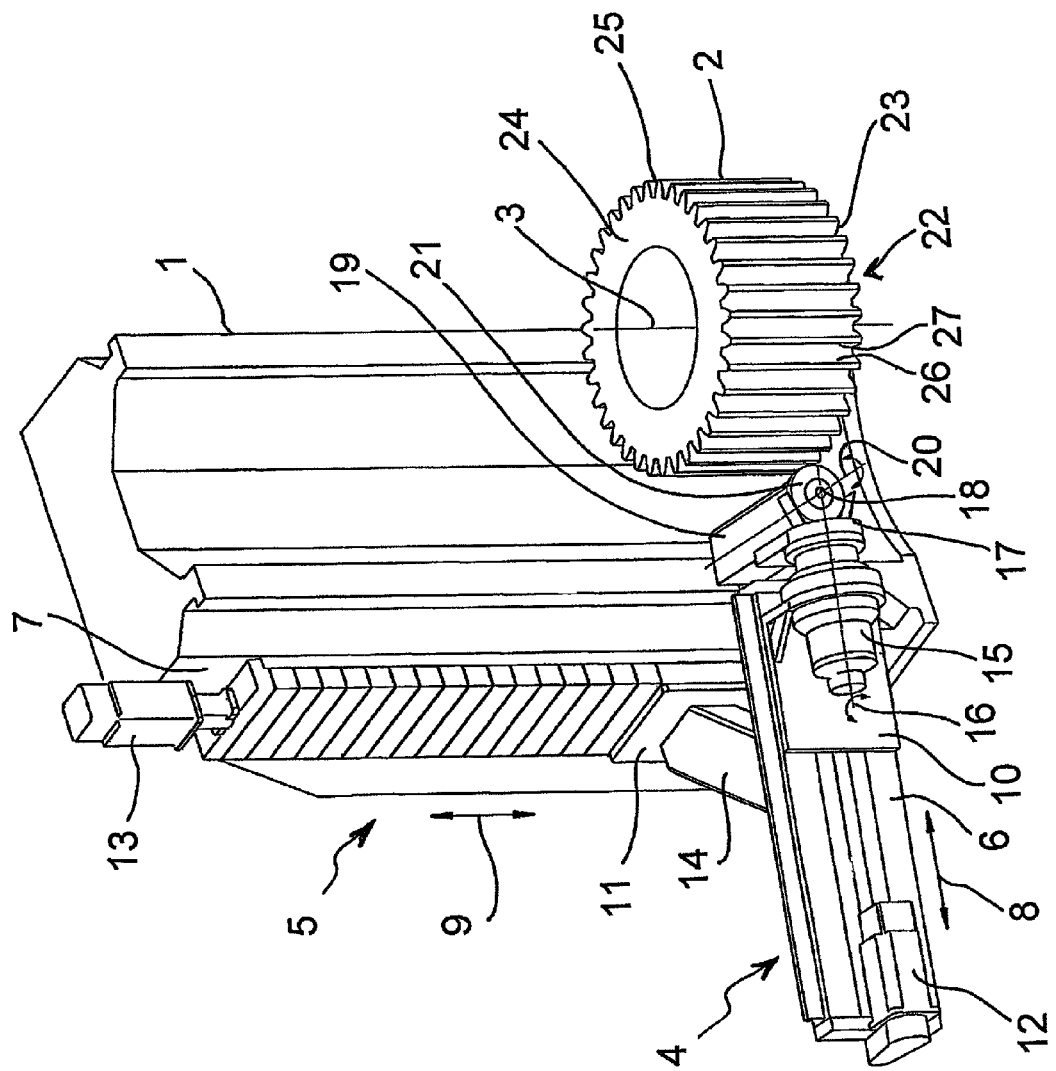

METHOD FOR MACHINING THE TOOTH EDGES OF END-CUT WORK WHEELS

This application claims the benefit of German Patent Application No. DE 10 2009 019 433.9 filed Apr. 29, 2009 the disclosure of which is hereby incorporated by reference.

FIELD OF THE INVENTION

The invention relates to a method for machining the tooth edges developed between each end face and the tooth flanks of end-cut work wheels. A machining tool that has a blade and is rotationally driven around a tool axis of rotation in a cutting direction is advanced successively to the work wheel, which is rotationally driven around a work wheel axis of rotation, in two machining positions assigned to the tooth edges of the two end faces, and a device suitable for executing said method.

BACKGROUND OF THE INVENTION

In a known device of this type (EP 1 495 824 A2), the machining tool for chamfering the tooth edges, and a hobbing cutter for generating the end-cut toothing of the work wheel, are clamped on one and the same shaft in a hobbing machine. After the face cutting has been completed, the shaft is adjusted in space such that the chamfering tool meshes with the tooth edges to effect the chamfering. Said machining is initially performed at one of the two end faces of the work wheel. Then the shaft is adjusted so that the machining is performed on the opposite, other end face. However, in doing so, the cutting direction of the chamfering tool is directed from inside to outside at the one end face, and from outside to inside at the opposite end face. If it is desired to have the cutting direction run from inside to outside at both end faces, two chamfering tools with opposite cutting directions have to be clamped on the shaft, and the direction of rotation of the shaft must be reversed between machining at both end faces. Furthermore, the arrangement of the chamfering tool(s) on the shaft of the hobbing cutter limits the length of the hobbing cutter. This approach also requires that the cutting of the end face toothing must first be completed before starting the chamfering process. Finally, because of the joint arrangement on the same shaft, the diameter of the chamfering tool(s) is dependent on the diameter of the hobbing cutter.

The invention is based on the problem of providing a method of the type described above which allows a more flexible process and a shorter machining time, as well as a device suitable for executing the method.

SUMMARY OF THE INVENTION

In accordance with the invention, this problem is solved with respect to the method in that between the two machining positions, the tool axis of rotation is swiveled between two swivel positions around an orthogonal swivel axis in which the cutting directions are opposite to each other relative to the work wheel.

BRIEF DESCRIPTION OF THE DRAWING

The sole FIGURE illustrates a column of a metal removing machine and a workpiece positionable on the metal removing machine.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

With the method in accordance with the invention, the tool axis of rotation of the machining tool is available as an independently adjustable axis. In this way, the diameter of the machining tool can be selected freely, in particular relatively small, which helps to avoid clamping collisions. Furthermore, while the direction of rotation of the drive of the machining tool remains the same in both swivel positions, the cutting directions of the machining tool are opposite to each other so that the toothing can be cut from inside to outside on the two end faces of the toothing in both machining positions. The machining tool can have only one or also a plurality of blades. In particular, the machining tool can be developed for chamfering and/or deburring the tooth edges. Furthermore, with a suitable design of its blade(s) and or kinematic of its tool axis of rotation, it can also be developed for one-flank or two-flank machining of the work wheel. In the first case, the left and the right tooth edge of a tooth gap are machined successively. In the second case, they are machined simultaneously.

In accordance with the method of the invention, the end toothing is preferably generated with hobbing or profiling. With hobbing, the machining at one of the two end faces can already be done during the main hobbing time. When the milling cutter and the machining tool are used during the main processing time, the rotation motion of their two tool axes of rotation is coupled with the rotation motion of the work wheel axis of rotation.

The machining tool can be designed with one or a plurality of blades. It can be developed as a short hob with helical incline or as a universal milling cutter. The synchronization between the rotation motion of the work wheel and the machining tool, which is required for the properly positioned meshing of the blade(s) of the machining tool and the tooth edges, is executed with an appropriately programmed control. To that end, one advantageous embodiment provides that cutting the end face toothing is first completed on one specimen of the work wheel and the control of the rotation and advance motions of the machining tool is programmed by a teach-in method as a function of the rotary position of the work wheel. For example, the machining tool is manually introduced into a toothed gap of the completely toothed work wheel and the left and right tooth flank are scanned. Similarly, the position of the blade of the cutting tool, which is determined by the rotary position of the cutting tool, is recorded relative to the end face of the work wheel. By transferring the recorded data into the control, the control is programmed for the specific machining task.

The drawing figure shows a device suitable for executing the method in accordance with the invention for machining the tooth edges developed between each end face and the tooth flanks of end cut work wheels. The method is preferably carried out with a work wheel seat that is driven to rotate around a work wheel axis of rotation and on which the work wheel is clamped; with a tool spindle that is driven to rotate around a tool axis of rotation and on which a machining tool having a blade is clamped to rotate in a cutting direction; a first linear motion unit having a first linear motion axis, which advances the machining tool to the work wheel, and a second linear motion unit having a second linear motion axis, which adjusts of the machining tool between two machining positions associated with the tooth edges of the two end faces. The inventive method and device are characterized in that a swiveling means having an orthogonal swivel axis relative to the axis of rotation of the tool is provided to swivel the tool axis of rotation in two swivel positions between the two machining positions in which the cutting directions are opposite to each other relative to the work wheel.

Because the tool axis of rotation can be swiveled, the cutting directions of the machining tool are opposite to each other in both swivel positions relative to the work wheel, while the direction of rotation of the drive of the tool spindle remains the same. Thus, the chamfers at the two opposite ends of the toothing are cut in opposite directions, for example in directions from the axial center of the toothing towards the two end faces, i.e., from inside to outside. This requires only one single machining tool. Said machining tool may have only one or a plurality of blades. In particular, the machining tool can be developed as a chamfering and/or deburring tool.

Preferably, the device in accordance with the invention is developed so that a hobbing tool that can mesh with the work wheel is arranged in a zone in the sense of direction of the work wheel axis of rotation, which is offset relative to the zone taken up by the tool spindle, to cut the end toothing of the work wheel. In doing so, the machining tool is completely independent from the hobbing tool. For example, the diameter of the machining tool can be chosen smaller than the diameter of the hobbing tool so as to avoid clamping collisions. It is also not necessary to align the machining tool with the hobbing tool. In particular, there is no decrease in the clamping length of the hobbing tool. Finally, the machining, for example the deburring and/or chamfering, can be performed during the primary processing time at one of the two end face toothing ends while the hobbing tool meshes with the work wheel.

In the following, the invention is explained in greater detail using an embodiment with reference to the illustration.

On a horizontal machine bed (not shown in the illustration), a work wheel seat (also not shown) and a column 1 running vertically in its longitudinal direction are arranged side-by-side in longitudinal direction of said machine bed. On said work wheel seat, a work wheel 2 that is to be provided with end-face toothing is clamped to rotate around a vertical work wheel axis of rotation 3. The rotary actuator of the work wheel seat, which is required for this purpose, is also not shown. The parts described as "not shown" above are developed in a fashion known to one skilled in the art of conventional hobbing machines.

A first linear motion unit 4 and a second linear motion unit 5 each have a carriage support 6 and/or 7 and a first carriage 10 and/or a second carriage 11, which can move longitudinally along a first linear motion axis 8 and/or a second linear motion axis 9. The first and second carriage 10, 11 is driven along its first and/or second linear motion axis 8, 9 with spindle drives having driving motors 12 and/or 13, which are also represented schematically in the illustration.

The carriage support 7 of the second linear motion unit 5 is arranged at a side face of the column 1 parallel to the longitudinal direction of the machine bed so that the second linear motion axis 9 runs vertically parallel to the work wheel axis of rotation 3. The carriage support 6 of the first linear motion unit 4 is fixed at the second carriage 11 by means of a transverse bar 14 in such a fashion that the first linear motion axis 8 of the first linear motion unit 4 is aligned in the direction of the work wheel 2 and runs orthogonally to the second linear motion axis 9.

The first carriage 10 supports a swivel motion means 15 having a swivel axis 16 that runs parallel to the first linear motion axis 8. On a swivel head 17 of the swivel motion means 15, which rotates around said swivel axis 16, a tool spindle 18 and its rotary actuator 19 is supported in such a fashion that their tool axis of rotation 20 runs orthogonally to the swivel axis 16 and intersects said swivel axis 16.

Clamped on the tool spindle 18 is an essentially cylindrical machining tool, which is developed as a chamfering tool 21. The machining tool has at least one blade and is rotationally driven by the tool spindle 18 in a cutting direction.

In the condition shown in the illustration, the chamfering tool 21 was displaced into a vertically lower machining position by means of the second linear motion unit 9 and is radially advanced to the work wheel 2 in that position by means of the first linear motion unit 8 in such a fashion that it meshes with the tooth edges 23 of said work wheel 2 which border the lower face 22 of the work wheel 2 to generate a chamfer there. In doing so, the cutting direction runs from top to bottom relative to the work wheel 2. After the chamfering of the lower tooth edges 23 is completed, the chamfering tool 21 is moved away from the work wheel 2 by means of the first linear motion unit 4 and displaced by means of the second linear motion unit 5 into a vertically upper machining position where it is advanced to the upper tooth edges 25 bordering the upper face 24 of the work wheel 2 by means of the first linear motion unit 4 to effect the chamfering of said teeth. However, before the chamfering tool is advanced, the tool spindle 18 is swiveled by means of the swivel motion means 15 such that the radial face of the chamfering tool 21 pointing to the left tooth flanks 26 points to the right tooth flanks 27 after the swivel motion; the cutting direction then runs from bottom to top relative to the work wheel 2.

In longitudinal direction of the machine bed, a bar (not shown) for a hobbing tool is arranged next to the work wheel 2 adjacent to its side facing away from the column 1. Said hobbing tool meshes with the work wheel 2 in the known fashion to machine the toothing.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method for machining a work wheel wherein said work wheel comprises an axis of rotation, two axially opposed end faces, tooth flanks extending between said end faces and tooth edges developed between each end face and the tooth flanks of the work wheel and wherein a machining tool having a blade and being rotationally driven around a tool axis of rotation in a cutting direction is advanced to the work wheel which is rotationally driven around the work wheel axis of rotation, said method comprising:
   assigning a first machining position to the tooth edges of one of the two end faces and assigning a second machining position to the tooth edges of the other of the two end faces,
   machining at the first machining position;
   machining at the second machining position;
   wherein between said two machining positions, the tool axis of rotation is displaced around an orthogonal swivel axis relative to the tool axis of rotation, between two swivel positions in which the directions of tool rotation are opposite to each other relative to the work wheel.

2. The method in accordance with claim 1 characterized in that in the first or second machining position, the respective cutting tool direction of rotation is directed toward the respective end face.

3. The method in accordance with claim 1 characterized in that the tooth flanks are generated by hobbing.

4. The method in accordance with claim 3 characterized in that at one of the two end faces the machining is performed during the hobbing.

5. The method in accordance with claim 4 characterized in that a rotation of a hobbing tool axis of rotation that is rotationally driven for the hobbing, and the rotation of the tool axis of rotation of the machining tool, are coordinated as a function of the rotation of the work wheel about the work wheel axis of rotation.

6. The method in accordance with claim 1 characterized in that profiling is used to generate the tooth flanks.

* * * * *